United States Patent [19]

Kulasinghe

[11] Patent Number: 5,398,663
[45] Date of Patent: Mar. 21, 1995

[54] COMBUSTION OF LIQUID FUELS

[76] Inventor: Arumadura N. S. Kulasinghe, Batagama Estate, Ja-ela, Sri Lanka

[21] Appl. No.: 64,106
[22] PCT Filed: Oct. 3, 1991
[86] PCT No.: PCT/GB91/01705
   § 371 Date: May 21, 1993
   § 102(e) Date: May 21, 1993
[87] PCT Pub. No.: WO92/09803
   PCT Pub. Date: Jun. 11, 1992

[30] Foreign Application Priority Data

Oct. 23, 1990 [LK] Sri Lanka ............... LK10209
Jan. 28, 1991 [LK] Sri Lanka ............... LK10228

[51] Int. Cl.$^6$ ............... F02M 31/18; F23K 5/22
[52] U.S. Cl. ............... 123/549; 123/557
[58] Field of Search ............... 123/545, 547, 549, 557, 123/552

[56] References Cited

U.S. PATENT DOCUMENTS

| | | | |
|---|---|---|---|
| 4,105,003 | 8/1978 | Funk | 123/547 |
| 4,108,953 | 8/1978 | Rocco | 123/545 |
| 4,356,805 | 11/1982 | Kler | 123/557 |
| 4,370,970 | 2/1983 | Kunz | 123/557 |
| 4,398,523 | 8/1983 | Henson | 123/557 |
| 4,509,464 | 4/1985 | Hansen | 123/557 |
| 4,883,616 | 11/1989 | Covey | 123/545 |
| 4,955,351 | 9/1990 | Lewis et al. | 123/545 |
| 5,048,501 | 9/1991 | Smith et al. | 123/557 |
| 5,050,571 | 9/1991 | Daniels | 123/557 |

Primary Examiner—David A. Okonsky
Assistant Examiner—M. Macy
Attorney, Agent, or Firm—Gifford, Krass, Groh, Sprinkle, Patmore, Anderson & Citkowski

[57] ABSTRACT

Liquid fuel is burned by feeding a mixture of a liquid together with liquid fuel which has been pre-gasified by rapid heating into a combustion zone. The liquid fuel is gasified by contact with a hot body. An internal combustion engine comprises a heated chamber having a heater, an air inlet and a fuel inlet. The mixture of gasified fuel and air is then introduced into the inlet manifold of the engine. Atomized liquid fuel and air is also inducted into the engine in a conventional manner, such as via a carburettor.

9 Claims, 1 Drawing Sheet

COMBUSTION OF LIQUID FUELS

FIELD OF THE INVENTION

The invention relates to the combustion of liquid fuels, particularly fuels such as petrol or gasolene, diesel oil and fuel oil, in internal combustion engines.

BACKGROUND OF THE INVENTION

Liquid fuels have for many years been the source of energy in internal combustion engines. The liquid fuel is inducted into the cylinder in the form of a mixture of atomised fuel droplets and air. One of the problems facing Automotive Engineers is that of ensuring even distribution of fuel within the air, and of ensuring complete combustion of the fuel within the cylinder. Incomplete combustion leads to poor fuel economy and increased pollutant exhaust emissions. However, liquid fuel has the advantage of being easily storable and having a high energy content per unit volume. It is also known to run internal combustion engines on gaseous fuels such as methane, propane, butane and hydrogen. Combustion processes tend to be improved and pollutant emissions are reduced. However, the handling and storage of compressed or liquified gases poses substantial difficulties and is hazardous. In fact, special pressurised storage vessels are required, which are generally bulky.

It is an object of the present invention to mitigate these disadvantages.

SUMMARY OF THE INVENTION

The present invention provides an internal combustion engine, which comprises an inlet manifold for inducting air into a cylinder constituting a combustion zone for burning a liquid fuel; a heated chamber having an outlet connected to said inlet manifold and having an air inlet and a liquid fuel inlet for feeding part of the liquid fuel into the chamber; a heating means in the chamber to convert said part of the liquid fuel to the gas phase, the heating means comprising a heated cup heated to a temperature above the boiling point of the liquid fuel such that droplets of liquid fuel received in the heated cup are converted substantially instantaneously to the gas phase prior to being fed to the combustion zone.

It is preferred that the gasified fuel be fed (in admixture with air) into the inlet manifold of the engine. The remainder of the liquid fuel is fed in atomised form in conventional manner either as a mixture of air and fuel droplets via the carburettor into the inlet manifold or by direct fuel injection into the cylinder.

In a diesel engine, a minimum quantity of diesel fuel in liquid form (usually less than 20%, preferably less than 15% of the total fuel) is fed through the injectors in order to provide a correctly timed induction and ignition of fuel.

The heated cup is provided with an air inlet to allow passage of air therethrough in order to flush the gaseous fuel into the inlet manifold. In order to control the flow of air, a valve may be provided on the air inlet to a chamber containing the heated cup.

The heating means may be an electrical heater, or heating may be achieved by means of hot exhaust gas from the engine passing through a heat exchanger, or by means of a liquified petroleum gas (LPG) burner. Clearly, more heat is required to gasify higher boiling hydrocarbons. For example, the heating means is generally heated to 110°–130° C. for petrol, 180°–220° C. for petrol, 180°–22° C. for kerosene, and 270°–330° C. for diesel oil.

The invention further provides a method of improving the fuel efficiency of an internal combustion engine which comprises inducting a part of the fuel in the gaseous form, the fuel having been gasified by feeding droplets of fuel into a cup heated to a temperature above the boiling point of the liquid fuel such as to convert the fuel substantially instantaneously to the gas phase; and the remainder of the fuel being in a non-gasified form, and burning the fuel in the combustion zone of the engine.

BRIEF DESCRIPTION OF PREFERRED EMBODIMENT

Embodiments of the present invention will now be described by way of example only with reference to FIG. 1 which is a schematic diagram of an internal combustion engine wherein part of the liquid fuel is pre-gasified; and FIG. 2 which shows an alternative way of feeding liquid fuel to the gasifier.

DETAILED DESCRIPTION OF PREFERRED EMBODIMENT

Figures 1, 2:
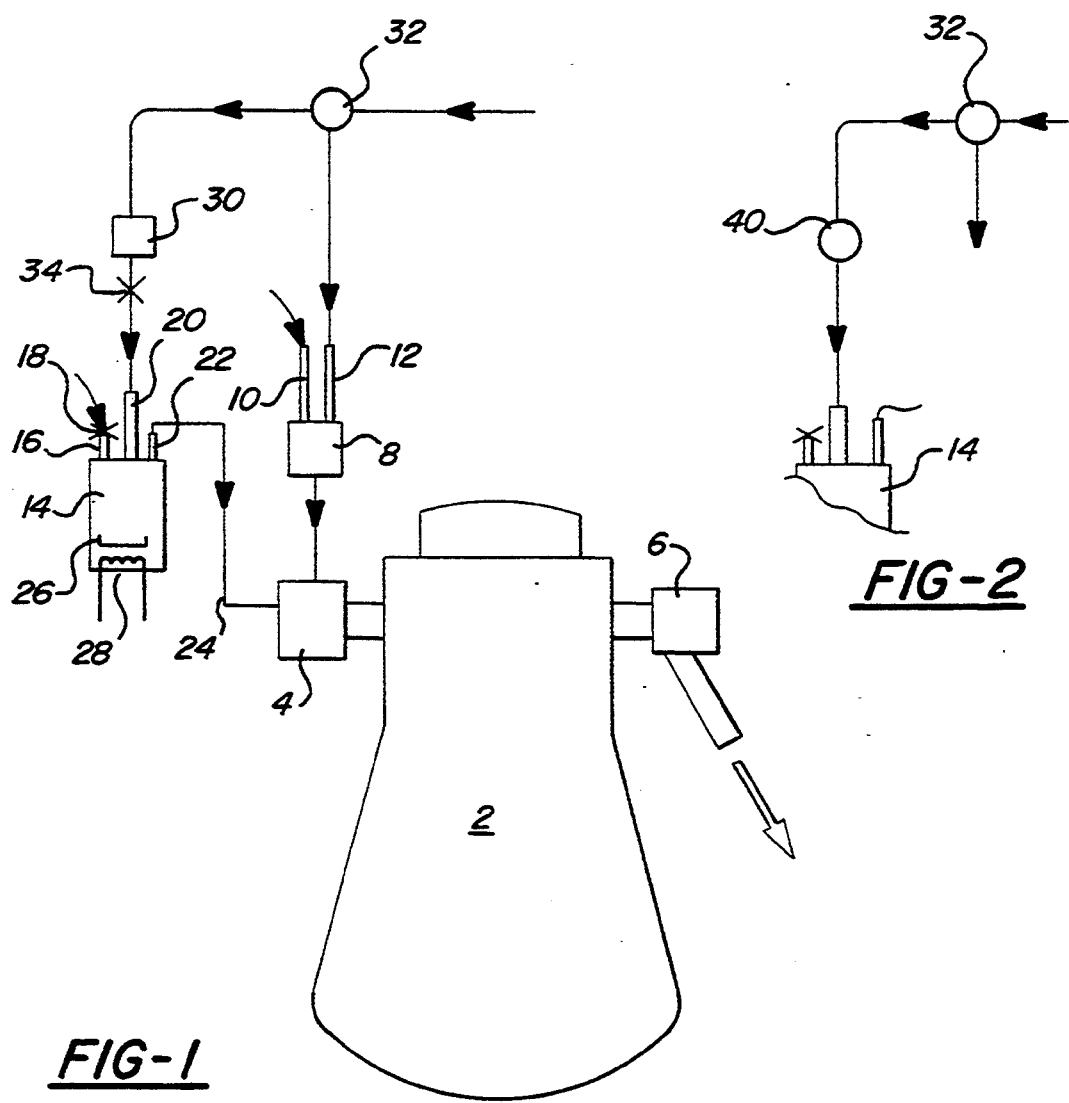

The engine comprises an engine block 2 containing a plurality of cylinders and having an inlet manifold 4 and exhaust manifold 6. The engine operates according to a 4 stroke spark-ignition cycle and is provided with a conventional carburettor 8 having an air inlet 10 and a fuel feed line 12. The carburettor is mounted on the inlet manifold in the normal way.

The modification according to the present invention comprises a chamber 14 having an air inlet 16 controlled by a valve 18 and a fuel inlet 20 provided at the top of the chamber. There is also an outlet 22 connected by a pipe 24 for feeding gasified fuel/air mixture into the inlet manifold 4. In the bottom of the chamber there is provided a cup 26 heated by means of an electrical heater 28 connected to the battery of the engine (not shown).

The apparatus is operated as follows. The engine is started using a starter motor (not shown) in the normal way with part of the fuel requirement of the engine passing to the carburettor and the other part passing through inlet 20 into the heated chamber 14 and thence into the inlet manifold as a gasified fuel/air mixture. The majority of the air requirements for the engine pass through inlet 10 and carburettor 8, though a minor flow of air passes through inlet 16 and heated chamber 14 to sweep the gasified fuel into the inlet manifold. The heated cup 26 is maintained at approximately 120° C. by the electrical heater 28 though the precise temperature will depend upon the amount of fuel passing through the heated chamber. If necessary, the cup 26 may be thermostatically controlled to maintain a particular desired temperature which is sufficient to completely gasify the liquid fuel before it passes out of the chamber 14. Droplets of liquid fuel fall from inlet 20 into the heated cup 26 where they become substantially instantaneously converted to gas. The flow of air through air inlet 16 is controlled by valve 18 such as to efficiently transfer the gasified fuel into the inlet manifold with a minimum delay in order to avoid any acceleration lag. Valve 18 is manually adjusted or linked to the accelerator pedal to ensure automatic operation. The flow of liquid fuel into the heated chamber via inlet 20 is controlled by the reduced pressure in the inlet manifold 4. Once again, the air inlet valve 18 is Operated so as to maintain the desired reduced pressure in the chamber 14 and thus adjust the liquid fuel flow into the heated chamber. Generally, the inlet 20 will be connected to a float chamber 30 in order to provide a flow of liquid fuel controlled by a valve 34 to the heated chamber 14. Alternatively, as shown in FIG. 2, the liquid fuel can be introduced by means of positive displacement variable delivery pump 40. This feeds fuel directly into the chamber without the need for the float chamber or control valve. The ratio of atomised fuel passing into the inlet manifold from the carburettor 8 and the amount of gasified fuel passing into the inlet manifold from the heated chamber 14 is controlled by regulator 32 so as to maximise combustion efficiency and provide desired engine power and torque and exhaust emission characteristics.

EXAMPLE 1

A four-stroke spark-ignition carburettor petrol engine in a 15 Sri 3118 Peugeot 505 car was fitted with a fuel gasification apparatus as shown in FIG. 1 which fed gasified fuel/air mixture into the inlet manifold. The vehicle was tested on a section of road with normal road traffic. The fuel consumption with the gasification apparatus disconnected was 6 kilometers per standard bottle of fuel. With the gasification apparatus connected, the fuel consumption improved to 10.4 kilometers per bottle of fuel. This represents an increase of 73.4% in distance travelled and a 42.3% saving in fuel consumed with the gasification device connected. There was also a noticeable improvement in acceleration performance.

EXAMPLE 2

An analogous test was carried out on an ISUZU diesel lorry, Model 350 No. 40 Sri 7325. The mileage per standard bottle of fuel was as follows:
6 km per bottle—gasifier disconnected
10 km per bottle—gasifier connected
This represents an additional mileage of 66.7% and a fuel saving of 40%.

I claim:

1. An internal combustion engine, which comprises an inlet manifold (4) for inducting air into a cylinder constituting a combustion zone (2) for burning a liquid fuel; a heated chamber (14) having an outlet (22) connected to said inlet manifold and having an air inlet (16) and a liquid fuel inlet (20) for feeding part of the liquid fuel into the chamber; a heating means (28) in the chamber to convert said part of the liquid fuel to the gas phase, the heating means comprising a heated cup (26) heated to a temperature above the boiling point of the liquid fuel such that droplets of liquid fuel received in the heated cup are converted substantially instantaneously by contact therewith to the gas phase prior to being fed to the combustion zone.

2. An apparatus according to claim 1 wherein liquid fuel is drawn into the heated chamber by a partial vacuum existing in the inlet manifold during running of the engine.

3. An apparatus according to claim 1 wherein liquid fuel is fed into the heated chamber by positive displacement pump means.

4. An apparatus according to claim 1 wherein the air inlet is provided with a valve (18) which is variable to control the air flow into the heated chamber.

5. An apparatus according to claim 1 which further comprises means (34) for controlling the flow of liquid fuel of the liquid fuel inlet to the heated chamber.

6. An apparatus according to claim 1 wherein the heating means is an electrical heater (28).

7. An apparatus according to claim 1 wherein the heating means is a heat exchanger through which passes hot exhaust gas from the engine.

8. An apparatus according to claim 1 wherein the heating means is a liquified petroleum gas burner.

9. A method of improving the fuel efficiency of an internal combustion engine which comprises inducting a part of the fuel in the gaseous form, the fuel having been gasified by feeding droplets of fuel into a cup heated to a temperature above the boiling point of the liquid fuel such as to convert the fuel substantially instantaneously by contact therewith to the gas phase; and the remainder of the fuel being in a non-gasified form, and burning the fuel in the combustion zone of the engine.

* * * * *